(12) United States Patent
Srikant et al.

(10) Patent No.: US 6,981,037 B1
(45) Date of Patent: Dec. 27, 2005

(54) METHOD AND SYSTEM FOR USING ACCESS PATTERNS TO IMPROVE WEB SITE HIERARCHY AND ORGANIZATION

(75) Inventors: Ramakrishnan Srikant, San Jose, CA (US); Yinghui Yang, Philadelphia, PA (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 09/757,759

(22) Filed: Jan. 9, 2001

(51) Int. Cl.[7] ............................................. G06F 13/00
(52) U.S. Cl. ................................................. 709/223
(58) Field of Search ..................................... 709/223

(56) References Cited

U.S. PATENT DOCUMENTS

| | | | | |
|---|---|---|---|---|
| 5,835,905 A | * | 11/1998 | Pirolli et al. .................. 707/3 |
| 5,966,126 A | * | 10/1999 | Szabo ......................... 345/762 |
| 6,425,005 B1 | * | 7/2002 | Dugan et al. ................ 709/223 |
| 2001/0034637 A1 | * | 10/2001 | Lin et al. ....................... 705/10 |

* cited by examiner

Primary Examiner—Anthony Knight
Assistant Examiner—Michael B. Holmes
(74) Attorney, Agent, or Firm—Samuel A. Kassatly (57) ABSTRACT

A hierarchy improvement system and associated method automatically locate "weak spots" in a hierarchical organization of a Web site, where the visitors' expected locations of Web pages, Web sites, or Web points (i.e., nodes) do not coincide with their actual locations. The system mines the users' access patterns, such as backtracks, and determines the most likely locations of the Web pages by discovering or inferring backtracks. Once the expected locations are defined, the system either forwards the expected locations with a high frequency of repetition or a substantially high benefit value to the Web site administrator for corrective action, such as adding direct navigation links from the expected locations to the target pages, or automatically adding such navigation links.

39 Claims, 5 Drawing Sheets

METHOD AND SYSTEM FOR USING ACCESS PATTERNS TO IMPROVE WEB SITE HIERARCHY AND ORGANIZATION

FIELD OF THE INVENTION

The present invention relates to the field of automated information retrieval in the general context of the Internet. Particularly, the present invention relates to a system and associated method for mining and using user access patterns, such as backtracks, to determine the expected locations of Web pages.

BACKGROUND OF THE INVENTION

The World Wide Web (WWW) is comprised of an expansive network of interconnected computers upon which businesses, governments, groups, and individuals throughout the world maintain inter-linked computer files known as Web pages. Users navigate these pages by means of computer software programs commonly known as Internet browsers. Due to the vast number of WWW sites, many Web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The present invention addresses the pervasive need to improve the hierarchical organization of Web sites. The Web sites organization may be quite different from the organization expected by visitors to the Web sites. Hence, it is often unclear under which branch of the hierarchical organization a specific document or page is located.

Several attempts have been made to address this need, exemplary of which are the following references:

M. Perkowitz et al., "Adaptive Web sites: Automatically synthesizing Web pages," In Proc. of the Fifteenth National Conference on Artificial Intelligence (AAAI), 1998; and M. Perkowitz et al. "Towards adaptive sites: Conceptual framework and case study," In Proc. of the Eighth Int'l World Wide Web Conference, Toronto, Canada, May 1999, investigate the problem of index page synthesis: the automatic creation of pages that facilitate a visitor's navigation of a Web site. After analyzing the web log, the publication describes a cluster mining algorithm that generates index pages which includes links to pages at the site relating to a particular topic. The publication also find collections of pages that tend to co-occur in visits and put them under one topic.

T. Nakayama et al., "Discovering the gap between Web site designers' expectations and users' behavior," In Proc. of the Ninth Int'l World Wide Web Conference, Amsterdam, May 2000, also try to discover the gap between Web site designers' expectations and users' behavior. However the approach described in this publication uses inter-page conceptual relevance to estimate the former web site designers, and the inter-page access co-occurrence to estimate the latter users' behavior. This publication also focuses on Web site design improvement by using multiple regression to predict hyperlink traversal frequency from page layout features.

Spiliopoulou et al., "WUM: A web utilization miner," In Proc. of EDBT Workshop WebDB98, Valencia, Spain, March 1998; and Spiliopoulou et al., "A data miner analyzing the navigational behaviour of web users," In Proc. of the Workshop on Machine Learning in User Modeling of the ACAI99, Greece, July 1999, propose a "web utilization miner (WUM)" to find interesting navigation patterns. The interestingness criteria for navigation patterns are dynamically specified by the human expert using WUM's mining language that supports the specification of criteria of statistical, structural and textual nature.

Chen et al., "Data mining for path traversal patterns in a web environment," In Proceedings of the 16th International Conference on Distributed Computing Systems, pages 385–392, May 1996, present an algorithm for converting the original sequence of log data into a set of maximal forward references and filtering out the effect of some backward references that are mainly made for ease of traveling.

Pei et al., "Mining access patterns efficiently from web logs," In Proc. of the 4th Pacific-Asia Conference on Knowledge Discovery and Data Mining, pages 396–407, April 2000, propose a data structure, called Web access pattern tree for efficient mining of access patterns from pieces of logs.

Shahabi et al., "Knowledge discovery from users web-page navigation," In Proc. of the 7th IEEE Intl. Workshop on Research Issues in Data Engineering (RIDE)," pages 20–29, 1997, propose a method for capturing the client's selected links and pages order, page viewing time and cache references. The information is then utilized by a knowledge discovery technique to cluster users with similar interests.

However, none of these publications addresses the issues of users' expectations to find pages, and of discovering any mismatch between the site organization and users' expectations. It would therefore be desirable to provide a system and associated method for mining and using user access patterns, such as backtracks, to determine the most likely locations of Web pages, in order to improve the Web sites hierarchy and organization.

SUMMARY OF THE INVENTION

The present invention teaches a hierarchy improvement system and associated method that satisfy this need. It is one feature of the present invention to provide a system and method that automatically locate "weak spots" in a hierarchical organization where the visitors' expected locations of Web pages, Web sites, or Web points (i.e., nodes) do not coincide with their actual locations.

The foregoing and other features and objects of the present invention are realized by a system that implements a method or algorithm for mining and using user access patterns, such as backtracks, to determine the most likely locations of Web pages. Typically, when Web site visitors do not find the information at the expected locations, they will backtrack up the hierarchy and search again for the target page. An important aspect of this invention is that the Web point (node or page) at which the visitors backtrack is the expected location of the page. This point is referred to herein as the expected location of the Web page.

The present algorithm discovers or mines such backtracks, or infers the backtracks if some of the pages are cached. Once the expected locations are defined, the algorithm could forward these expected locations with a significant number of hits to the Web site administrator for corrective action, such as adding direct navigation links from the expected locations to the target pages.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Actual location: The page that has a link to a target page.

Backtrack: Retrace path or reverses course.

Backtrack node: A node, point or page at which a visitor or user backtracks.

Child (also daughter): From graph theory, a node pointed to by a path from a parent.

Crawler: A program that automatically explores the World Wide Web by retrieving a document and recursively retrieving some or all the documents that are linked to it.

Depth (level) of a node: The number of nodes from the root to the node in its tree.

Expected location: The page that the visitor expects will contain a link to the target page.

Hit: A response to a search query on the WWW. The response is a document found by the search engine that contains key words or other attributes relevant to the search query.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

HTML document: A document marked up in HTML.

Internet: A collection of interconnected public and private computer networks that are linked together with routers by a set of standard protocols to form a global, distributed network.

Keyword: A string that spells out the name of a concept.

Label of a node: The name of the node. It is one of the keywords specified by the user.

Leaf: Terminal node of a tree; a node with no child/daughter.

Markup language: A method of adding information to the text indicating the logical components of a document, or instructions for layout of the text on the page or other information which can be interpreted by some automatic system.

Node: A point or vertex in a graph, such as a Web page.

Path: The sequence of nodes encountered in the route between any two nodes (inclusive).

Parent: The immediate predecessor of a node in a tree.

Root node: A node with no parent but typically with children.

Search engine: A remotely accessible World Wide Web tool that allows users to conduct keyword searches for information on the Internet.

Server: A software program or a computer that responds to requests from a web browser by returning ("serving") web documents.

Subpath: Path A is a subpath of path B if the sequence of nodes of A is part of the sequence of nodes of B.

Tags: Codes (as in HTML or XML) that give instructions for formatting or action.

Target page: A page the user is looking for.

Tree: A hierarchical structure which is made up by nodes. Nodes are connected by edges from one node (parent) to another (child). A single node at apex of the tree is known as the root node, while the terminus of a path in the opposite direction is a leaf.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or Web page: A collection of data available on the World Wide Web and identified by a URL. In the simplest, most common case, a Web page is a file written in HTML and stored on a web server. It is possible for the server to generate pages dynamically in response to a request from the user. A Web page can be in any format that the browser or a helper application can display. The format is transmitted as part of the headers of the response as a MIME type, e.g. "text/html", "image/gif". An HTML Web page will typically refer to other Web pages and Internet resources by including hypertext links.

Weblog: A weblog includes a sequence of records such as: a machine identification (ID) that can be used as a proxy for a user identification (ID); time and date of the Web page access; and the Web page address. Generally, Web sites are built using web server software that responds to http page requests. Most web server softwares have an option to log all such page requests, such as whenever they send a web page to a browser (across the Internet), they write the machine ID of the browser that requested the page, time and data, and the web page address along with other information to the web log.

Web site: A database or other collection of inter-linked hypertext documents ("web documents" or "Web pages") and associated data entities, which is accessible via a computer network, and which forms part of a larger, distributed informational system such as the WWW. In general, a Web site corresponds to a particular Internet domain name, and includes the content of a particular organization. Other types of Web sites may include, for example, a hypertext database of a corporate "intranet" (i.e., an internal network which uses standard Internet protocols), or a site of a hypertext system that uses document retrieval protocols other than those of the WWW.

World Wide Web (WWW, also Web): An Internet client—server hypertext distributed information retrieval system.

Figure 1:
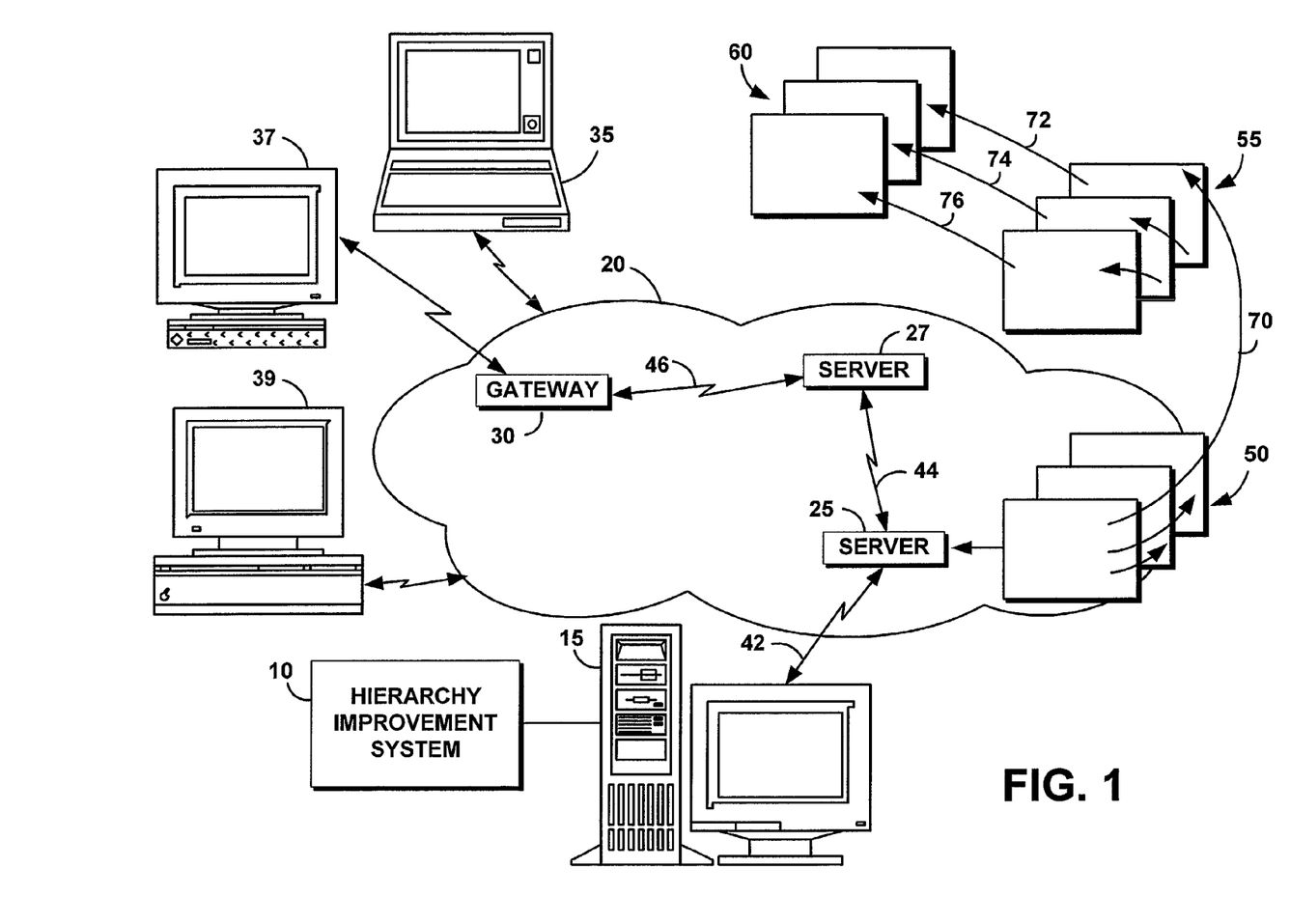
FIG. 1 is a schematic illustration of an exemplary operating environment in which a hierarchy improvement system of the present invention can be used.

FIG. 1 portrays the overall environment in which a hierarchy improvement system 10 according to the present invention may be used. The system 10 includes a software or computer program product which is typically embedded within, or installed on a host server 15. Alternatively, the system 10 can be saved on a suitable storage medium such as a diskette, a CD, a hard drive, or like devices. While the system 10 will be described in connection with the WWW, the system 10 can be used with a stand-alone repository of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
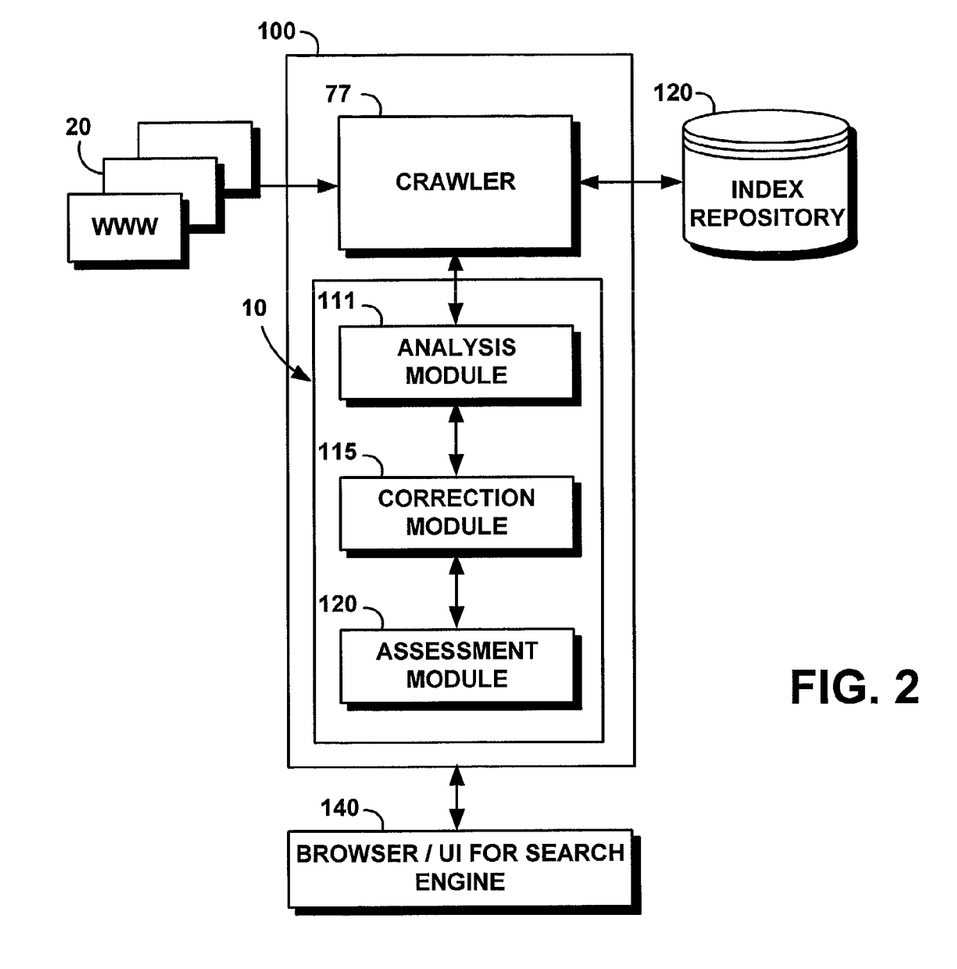
FIG. 2 is a block diagram that illustrates a high level architecture of the hierarchy improvement system of FIG. 1 shown used in the context of an Internet environment.

FIG. 2 illustrates a high-level architecture showing the system 10 used in the context of an Internet environment. The system 10 is shown to reside on the search service provider 100, and connected to a crawler 77 that mines the network 20 or an index repository 120. In alternative embodiments, the system 10 can reside on a designated server 15, or it can be a stand-alone application.

As a specific example, the users are shown to access the search service provider 100 by means of a Web browser or user interface 140. The system 10 mines at least some designated Web sites, analyzes their hierarchical configurations in view of the users' access, determines the users' expected locations from the weblogs, and proposes corrective, optimization actions, such as the establishment or new links, rearrangement of existing links, and/or removal of redundant links, to be implemented by the Web sites administrators. In another example, the system 10 is authorized to automatically optimize the Web sites hierarchical configurations.

The system 10 includes an analysis module 111 for analyzing user access patterns to automatically locate weak spots in the hierarchical organization, where user's expected locations do not coincide with target pages. The system 10 is further comprised of a correction module 115 for determining available corrective measures to compensate for the weak spots, and an assessment module 120 for assessing the corrective measures. In response to the assessment of the corrective measures, the assessment module selectively implements the corrective measures.

Figure 3:
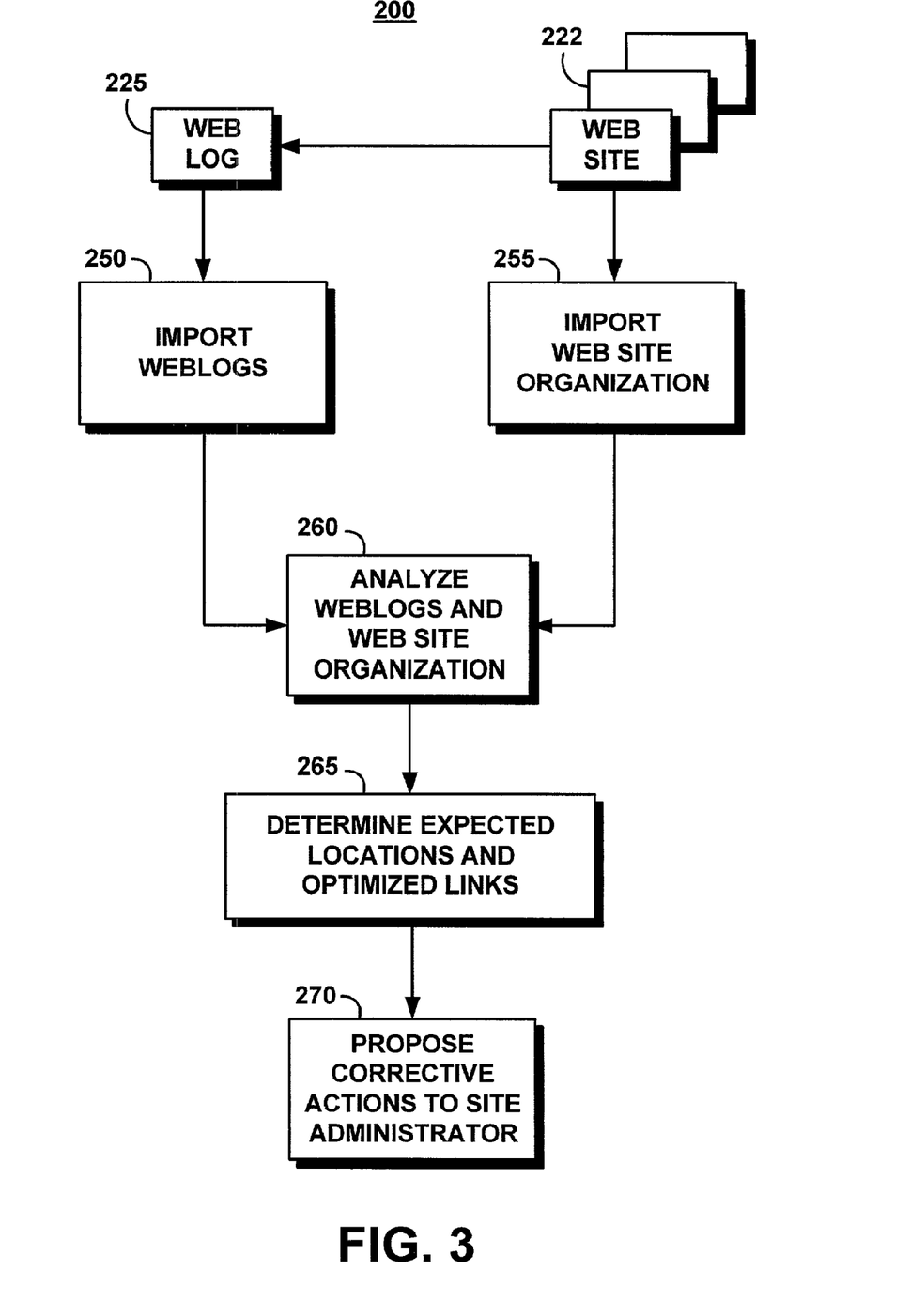
FIG. 3 is a flow chart representing an overall operation of a hierarchy improvement method implemented by the system of FIG. 2.

With further reference to FIG. 3, it illustrates a preferred embodiment of a hierarchy improvement method 200 implemented by the system 10 of FIG. 2. In this example, the method 200 is shown in the process of optimizing access to a Web site 222.

The method 200 imports the hierarchical organization of the Web site 222 at step 255. Furthermore, for each page of the Web site 222, the method 200 imports the weblogs 225 associated with each visitor's access. As defined earlier, a weblog includes a sequence of records such as: a machine identification (ID) that can be used as a proxy for a user identification (ID); time and date of the Web page access; and the Web page address. Every time a server serves the Web page, the method 200 generates updated records and appends the same to the corresponding weblog.

By analyzing the imported weblogs 250 and the hierarchical organization of the Web site 222 at step 260, the method 200 determines the expected locations of the Web pages and the optimized linking structure that will facilitate and expedite users' access to the actual locations of the desired Web pages. The method 200 then, at step 270, either proposes corrective actions, such a change in the linking structure of the Web site 222, or automatically implements such action.

Figure 4:
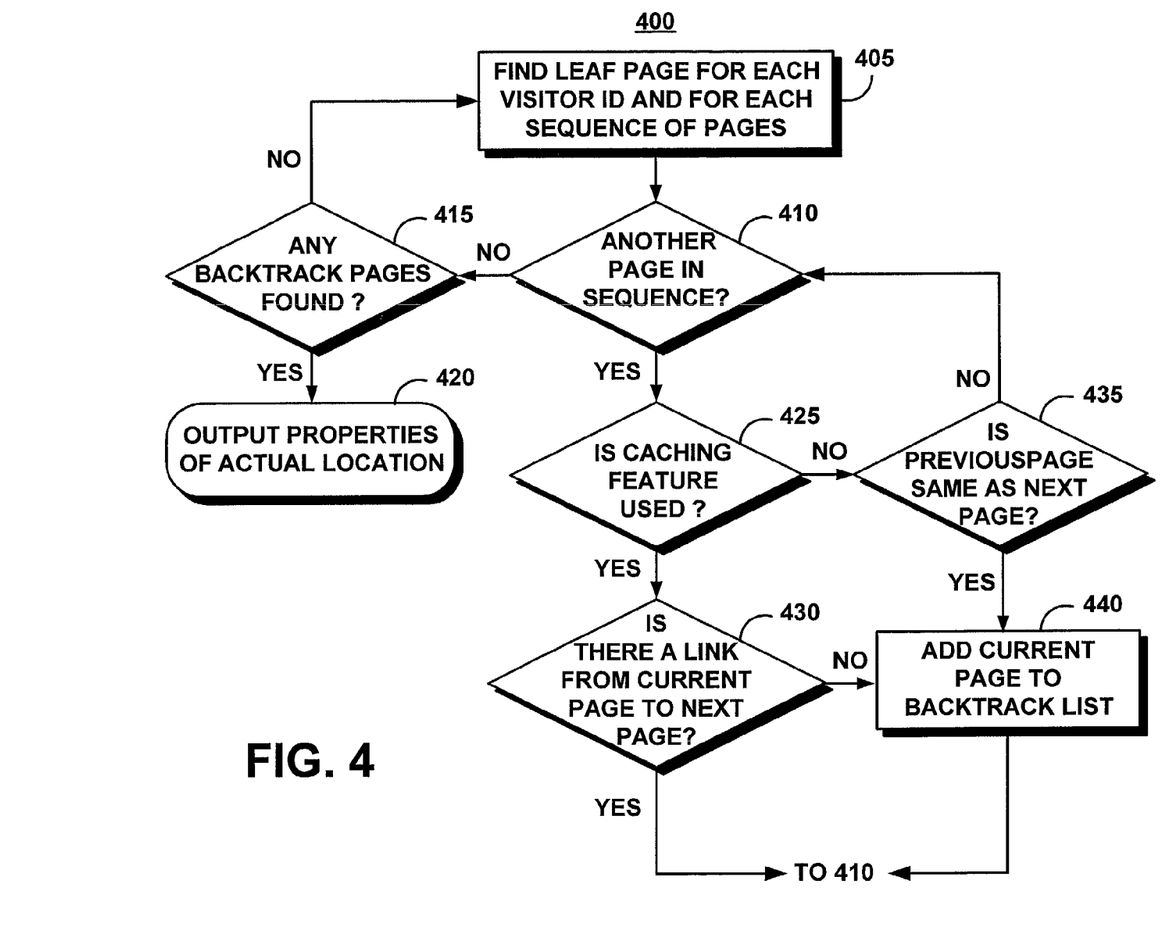
FIG. 4 is a more detailed flow chart further illustrating the operation of the hierarchy improvement method of FIG. 3.

A more specific implementation 400 of the method 200 is illustrated in FIG. 4. The method 400 starts at step 405 by identifying the leaf pages for each visitor's identification (ID) and for each sequence of pages that terminate in one or more leaf pages. The method 400 proceeds to decision step 410 and inquires if, for each visitor ID, there remains another page in the sequence that remains to be analyzed.

If no such page exists, that is when the method 400 has finished analyzing all the pages in the sequence associated with each visitor of the Web site 222 (FIG. 3), the method 400 inquires at step 415 if there are any backtrack pages that have been identified at step 405. If no backtrack pages have been identified, the method 400 returns to step 405 and repeats steps 405 and 410 for another visitor ID and/or for another sequence of pages.

If, however, at step 415 the method 400 confirms the existence of backtrack pages, it outputs the properties of the actual locations of the desired Web pages (step 420). The method 400 presumes that the visitor has backtracked from an expected page location in an attempt to find the actual location of the desired Web page.

The properties of the actual Web page location are as follows: 1) the leaf page which is the last page in the sequence being analyzed, and which is also the page the user was looking for; 2) the backtrack list comprised of the backtrack pages, which are the expected locations for the leaf page; and 3) the actual location of the leaf page which is the last but one page in the sequence. Using these properties and based on the number of visitors who follow the same or similar backtrack paths (or sequences), the method 200 proposes corrective actions to the site administrator (step 270, FIG. 3).

Returning now to decision step 410, if the method determines that it has not exhausted the entire sequence of pages, that is there remains another Web page in the sequence, it proceeds to decision step 425 where it inquires if the caching feature has been selected or used. If the answer to this inquiry is in the affirmative, the method 400 proceeds to decision step 430 where it inquires if there exists a link from the current page to the next page.

If the method 400 confirms, at step 430, the existence of a link from the current page to the next page, it knows that the current page was not a backtrack point, and returns to step 410. If, however, the method 400 confirms, at step 430, the absence of a link from the current page to the next, page, it adds the current page to the backtrack list at step 440, returns to step 410, and proceeds as explained herein.

Returning to decision step 425, if the method 400 determines that the caching feature has neither been selected or used, it proceeds to decision step 435 where it inquires if the previous page is the same as the next page. If the answer to this inquiry is in the affirmative, the method 400 adds the current page to the backtrack list at step 440, returns to step 410, and proceeds as explained herein. If, however, the previous page is not the same as the next page, the method 400 returns directly to step 410, and proceeds as explained herein.

Figure 5:
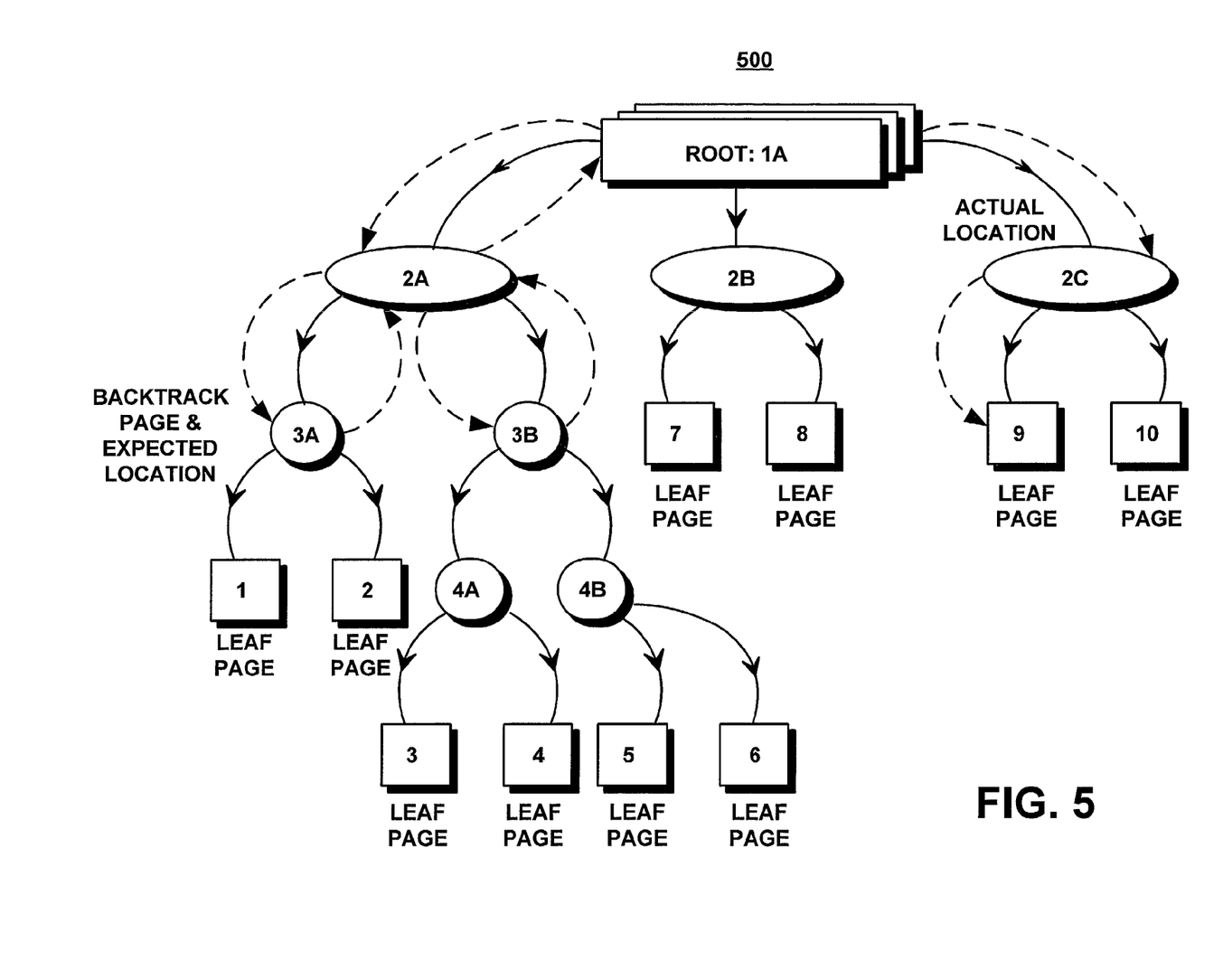
FIG. 5 is illustrates an exemplary tree that represents a hierarchical pattern of hypertext documents as implemented by the hierarchy improvement method of FIGS. 3 and 4.

An exemplary tree 500 is shown in FIG. 5 where page 1A is the root Web page. Page 1A is the parent for pages 2A, 2B, 2C. In turn, page 2A is the parent for pages 3A, 3B. Page 3A has links to two leaf pages 1 and 2. Page 3B is the is the parent for pages 4A, 4B. Page 4A has links to two leaf pages 3 and 4. Page 4B has links to two leaf pages 5 and 6. Page 2B has links to two leaf pages 7 and 8. Page 2C has links to two leaf pages 9 and 10.

In this example, the Web site visitor wishes to reach a leaf page 9. However, due to the hierarchical organization of the Web site, follows the following path or sequence: Root page 1A, page 2A, and then page 3A, expecting to find the desired information at page 3A instead of the leaf page 9. Having reached the page 3A, which is the expected location, without finding the desired information, the visitor backtracks from page 3A, which is the backtrack page, to page 2A, and therefrom to page 3B.

Not having reached the target information at page 3B, the visitor backtracks from page 3B, which is referred to as the expected location and the backtrack page, to page 2A, and therefrom to the root page 1A. The visitor then proceeds to another related page 2C and therefrom reaches the target leaf page 9. Page 2C is referred to as the actual location.

If a sufficient number of visitors, i.e., above a predetermined threshold value, follow the same or similar path, i.e., backtracking from the expected location at page 3A to the target leaf page 9, the system 10 will propose the addition of a link from the expected location (i.e., page 3A) to the actual location (i.e., leaf page 9).

According to another embodiment, the system 10 includes an algorithm for optimizing the benefits attained by the proposed recommendation to the site administrator. The benefit optimizing algorithm computes the benefit of adding the proposed link to the leaf page 9. In other terms, if the new link saves the visitor from making a significant number of links to arrive to the target leaf page 9 from the expected location, page 3A, the benefit accorded by the new link would be significant. On the other hand, if the new link saves the visitor only 1 or 2 linking steps, the benefit accorded by this new link might not be too significant for the Web site, and the system 10 will not recommend the inclusion of this latter link.

In some instances, the optimization algorithm might recommend the addition of links from all the expected locations, i.e., 3A and 3B in the above example to the actual location, i.e., page 2C, and/or the target page, i.e., leaf page 9. In other instances, after having assessed the benefits of adding the links from the expected locations, 3A, 3B, and the algorithm determines that the benefit of adding a link from page 3B is less than that achieved by a link from page 3A, and therefore does not recommend adding a link from page 3B.

The optimization algorithm protects against unnecessary over-linked structure of the Web site. As an example, if all or most of the expected locations were linked to the actual locations, the size of the Web site would increase unnecessarily, and the site access will become quite complicated thus defeating the purpose of the system 10. As a result, the system 10 will recommend the inclusion of links whose benefits exceed a benefit threshold set by the Web site administrator.

It is to be understood that the specific embodiments of the present invention that have been described are merely illustrative of certain applications of the principle of the present invention. Numerous modifications may be made to the system 10 and associated methods 200, 400 described herein without departing from the spirit and scope of the present invention. For example, while the present invention is described for illustration purpose in relation to the WWW, it should be clear that the invention is applicable as well to databases and other tables with indexed entries.

What is claimed is:

1. A method for optimizing a hierarchical organization of a network site, comprising:
   a processor analyzing user access patterns to automatically locate weak spots in the hierarchical organization, where user's expected locations do not coincide with actual locations; and
   the processor determining available corrective measures to compensate for the weak spots.

2. The method according to claim 1, further including assessing the corrective measures.

3. The method according to claim 2, further including in response to the assessing step, selectively implementing the corrective measures.

4. The method according to claim 2, further including in response to the assessing step, presenting the corrective measures to an administrator for review.

5. The method according to claim 3, wherein the analyzing step includes determining backtracks to identify the expected locations.

6. The method according to claim 3, for optimizing the hierarchical organization of a Web site, wherein the analyzing step includes determining backtracks to identify the expected Web pages.

7. The method according to claim 6, wherein the analyzing step further includes inferring backtracks if at least some Web pages have been cached.

8. The method according to claim 7, wherein the determining step includes adding at least one link from an expected location to a target page.

9. The method according to claim 8, wherein the assessing step includes evaluating a frequency with which visitors expect to find a web page at an expected location.

10. The method according to claim 9, wherein the assessing step includes evaluating a benefit of adding a link between the expected location and the target page.

11. The method according to claim 10, wherein the implementing step includes proposing that a new link be added between the expected location and the target page.

12. The method according to claim 9, wherein the implementing step includes automatically adding a link between the expected location and the target page.

13. The method according to claim 9, wherein the analyzing step includes:

importing a plurality of updated Weblogs for a Web page; and analyzing the hierarchical organization in light of the weblogs.

14. A computer program product for optimizing a hierarchical organization of a network site, comprising:

an analysis module for analyzing user access patterns to automatically locate weak spots in the hierarchical organization, where user's expected locations do not coincide with actual locations; and a correction module for determining available corrective measures to compensate for the weak spots.

15. The computer program product according to claim 14, further comprising an assessment module for assessing the corrective measures.

16. The computer program product according to claim 15, wherein in response to an assessment of the corrective measures, the assessment module selectively implements available corrective measures.

17. The computer program product according to claim 15, further including an assessment module for assessing the corrective measures; and in response to an assessment of the corrective measures, the assessment module presents the corrective measures to an administrator for review.

18. The computer program product according to claim 15, wherein the analysis module determines backtracks to identify the expected locations.

19. The computer program product according to claim 18, for optimizing the hierarchical organization of a Web site, wherein the analysis module determines backtracks to identify the expected Web pages.

20. The computer program product according to claim 19, wherein the analysis module further infers backtracks if at least some Web pages have been cached.

21. The computer program product according to claim 20, wherein the correction module adds at least one link from an expected location to a target page.

22. The computer program product according to claim 21, wherein the assessment module evaluates a frequency with which visitors expect to find a web page at an expected location.

23. The computer program product according to claim 22, wherein the assessment module evaluates a benefit of adding a link between the expected location and the target page.

24. The computer program product according to claim 23, wherein the assessment module proposes that a new link be added between the expected location and the target page.

25. The computer program product according to claim 23, wherein the assessment module automatically adds a link between the expected location and the target page.

26. The computer program product according to claim 23, wherein the analysis module imports a plurality of updated weblogs for a Web page, and analyzes the hierarchical organization in light of the weblogs.

27. A system having a plurality of executable instruction codes stored on a computer medium, for optimizing a hierarchical organization of a network site, comprising:

a first set of instruction codes for analyzing user access patterns to automatically locate weak spots in the hierarchical organization, where a user's expected locations do not coincide with actual locations; and a second set of instruction codes for determining available corrective measures to compensate for the weak spots.

28. The system according to claim 27, further comprising a third set of instruction codes for assessing the corrective measures.

29. The system according to claim 28, wherein in response to an assessment of the corrective measures, the third set of instruction codes selectively implements available corrective measures.

30. The system according to claim 28, further comprising a fourth set of instruction codes for assessing the corrective measures; and in response to an assessment of the corrective measures, the fourth set of instruction codes presents the corrective measures to an administrator for review.

31. The system according to claim 28, wherein the first set of instruction codes determines backtracks to identify the expected locations.

32. The system according to claim 31, for optimizing the hierarchical organization of a Web site, wherein the first set of instruction codes determines backtracks to identify the expected Web pages.

33. The system according to claim 32, wherein the first set of instruction codes further infers backtracks if at least some Web pages have been cached.

34. The system according to claim 33, wherein the second set of instruction codes adds at least one link from an expected location to a target page.

35. The system according to claim 34, wherein the fourth set of instruction codes evaluates a frequency with which visitors expect to find a web page at an expected location.

36. The system according to claim 35, wherein the fourth set of instruction codes evaluates a benefit of adding a link between the expected location and the target page.

37. The system according to claim 36, wherein the fourth set of instruction codes proposes that a new link be added between the expected location and the target page.

38. The system according to claim 36, wherein the fourth set of instruction codes automatically adds a link between the expected location and the target page.

39. The system according to claim 36, wherein the first set of instruction codes imports a plurality of updated weblogs for a Web page, and analyzes the hierarchical organization in light of the weblogs.

\* \* \* \* \*